US012773907B1

(12) United States Patent
Cormier

(10) Patent No.: US 12,773,907 B1
(45) Date of Patent: Oct. 27, 2026

(54) TURBINE EXHAUST AIR RECIRCULATION CONTROL SYSTEM FOR A VEHICLE

(71) Applicant: DePorres Cormier, Stone Mountain, GA (US)

(72) Inventor: DePorres Cormier, Stone Mountain, GA (US)

( * ) Notice: Subject to any disclaimer, the term of this patent is extended or adjusted under 35 U.S.C. 154(b) by 0 days.

(21) Appl. No.: 19/303,804

(22) Filed: Aug. 19, 2025

(51) Int. Cl.
*B60L 8/00* (2006.01)
*B60L 53/00* (2019.01)

(52) U.S. Cl.
CPC ............... *B60L 8/006* (2013.01); *B60L 53/00* (2019.02)

(58) Field of Classification Search
CPC ................. B60W 10/08; B60W 20/13; B60W 2510/244; B60W 2510/085
See application file for complete search history.

(56) References Cited

U.S. PATENT DOCUMENTS 11,351,873 B2 * 6/2022 Degand ................. B60L 15/209
11,572,056 B2 * 2/2023 Holz ..................... B60W 20/16
11,634,114 B2 * 4/2023 Choi ..................... B60W 10/08 701/22
11,760,335 B2 * 9/2023 Lavertu .................... B60K 6/46 701/22
2004/0050061 A1 * 3/2004 Schmotolocha .......... F23R 3/20 60/761
2010/0326756 A1 * 12/2010 Landgraf ............... B60K 13/02 180/68.3
2019/0143821 A1 * 5/2019 Bell ....................... B60W 10/08 180/65.225
2019/0221899 A1 * 7/2019 Tomai .................. H01M 10/613
2021/0405237 A1 * 12/2021 Semb ..................... G01V 1/162

FOREIGN PATENT DOCUMENTS

CN 119134518 A * 12/2024 ................ H02J 3/17

* cited by examiner

*Primary Examiner* — Redhwan K Mawari
(74) *Attorney, Agent, or Firm* — Thomas | Horstemeyer, LLP

(57) ABSTRACT

The present invention relates to wind-based generation of electric energy by using a turbine exhaust air recirculation system for a vehicle. The system includes an intake channel having a body into which air can flow and a turbine being rotatable by the air flowing via the intake channel. An exhaust airflow from the turbine enters a recirculation channel. A portion of the exhaust airflow within the recirculation channel exits via one or more exhaust air exit openings; wherein the exhaust air continues to flow towards the turbine, then reenters the turbine. In other embodiments, there are features like one or more pressure control devices and a plurality of vanes, which may be included in the system. These devices can control and increase the airflow velocity within the system.

23 Claims, 7 Drawing Sheets

TURBINE EXHAUST AIR RECIRCULATION CONTROL SYSTEM FOR A VEHICLE

FIELD OF THE INVENTION

The present disclosure relates in general to wind-based power generation, and more specifically wind-based power for vehicles.

BACKGROUND

More specifically, the invention relates to using a pressure control device to convert erratic high-pressure wind input into a steady and manageable velocity airflow to improve the charging and/or recharging of batteries in vehicles (e.g., electric and hybrid vehicles) by using the kinetic energy of airflow. Further, the invention relates to the recirculation of the exhaust airflow from a turbine by utilizing and recovering some of the kinetic energy that would otherwise be lost.

In the prior art, developments have advanced wind-based generation of electrical power for vehicles. Various methods and systems are known in the art for providing an intake channel and a turbine strategically mounted on or integrated into a vehicle to capture and convert airflow into electric energy to charge or recharge a battery. Although these known methods and systems have benefits, there are opportunities in the art for improvement.

The use of electric vehicles has increased over the past decade. Electric vehicles have become popular for various reasons such as their lack of tailpipe emissions, and government incentives. However, electric vehicles face battery capacity and range issues, which effects travel distances. Drivers often need to find charging stations, which can be inconvenient, especially in areas with sparse infrastructure. Frequent stops for charging can disrupt journeys. Moreover, the cost of charging at public stations can add up, making electric vehicles travel more costly and less convenient than at drivers' regular charging stations, e.g., residence.

SUMMARY OF THE INVENTION

This present invention summary provides a basic understanding of aspects of the disclosed innovation. It is not an exhaustive overview or intended to identify key elements or scope but serves as an introduction to the detailed description presented later.

This present invention relates to using one or more pressure control devices to convert erratic high-pressure wind input into a steady and manageable velocity airflow to improve the charging and/or recharging of batteries in vehicles (e.g., electric and hybrid vehicles) by using the kinetic energy of airflow. Further, the invention relates to the recirculation of the exhaust airflow from a turbine by utilizing and recovering some of the kinetic energy that would otherwise be lost.

It is an object of the invention to include one or more pressure control devices coupled between an intake channel and the turbine for generating electric power in accordance with certain example embodiments. The intake channel may be of various geometric shapes depending on the application and design. Some of the prior art channel designs used the Venturi effect and Bernoulli principle. The Venturi effect describes how fluid (e.g., wind/air/gas) pressure drops and velocity rises when passing via a narrow channel section. While according to the Bernoulli principle, for inviscid flows, an increase in fluid speed results in decreased pressure or potential energy. Therefore, the intake channel design using certain aspects of the Venturi effect is preferred. This design has a gradual tapering-conical design leading into a narrow throat. The air flows via the intake channel, then into the pressure control device(s). The pressure control device(s) can be used for adjusting and directing the airflow into the turbine to generate electricity to charge and/or re-charge a vehicle battery. This invention improves the vehicle's travel range by supplying energy to increase performance.

It is an object of the present invention to recapture some potential lost energy by using a recirculation channel to recirculate the exhaust air from the turbine. As the vehicle moves forward, the air enters the intake channel, then the airflow enters the turbine, then the turbine's exhaust air enters the recirculation channel. A portion of the exhaust airflow within the recirculation channel exits via one or more exhaust air exit openings; wherein the exhaust air continues to flow towards the turbine, then reenters the turbine. The exhaust airflow from the turbine increases the kinetic energy within the system. Some key components, e.g., the intake channel, the recirculation channel, and the turbine, are within a recirculation housing. The recirculation housing and the recirculation channel could vary in size, length, shape, and design to assist with the consistency and velocity of the airflow. However, the recirculation housing design is preferably a cylinder shape. There are numerous implementation-specific decisions that must be made to achieve the developers' specific goals.

It is an object of the present invention to recapture some potential lost energy by controlling the airflow within the system using one or more pressure control devices for a vehicle. The pressure control device(s) may be placed within the body of the intake channel and the recirculation channel. The turbine coupled between the intake channel and the recirculation channel. As the vehicle moves forward, the air enters the intake channel, then the airflow enters the turbine, then the turbine's exhaust air enters the recirculation channel. The pressure control device(s) coupled to the exhaust air exit opening(s) within the recirculation channel and the recirculation housing. A portion of the exhaust airflow within the recirculation channel enters the pressure control devices, then exits via the exhaust air exit openings within the recirculation channel and the recirculation housing; wherein the exhaust air continues to flow towards the turbine, then reenters the turbine. The exhaust airflow from the turbine increases the kinetic energy within the system.

It is an object of the present invention to use one or more pressure control devices. The pressure control devices may be designed to regulate, manipulate and/or measure the pressure of air in the system. There are various types of pressure control devices, e.g., pressure regulators, valves, dampers, control valves, one-way control valves, and control dampers.

It is another object of the present invention to measure the airflow (e.g., airflow, pressure, and temperature) and monitor activities and/or operations by placing one or more inputs and outputs (I/O) devices within the body of the intake channel and the recirculation channel.

It is another object of the present invention to direct airflow toward the turbine and increase the air velocity by placing a plurality of vanes within the body of the recirculation channel.

It is another object of the present invention to direct airflow toward the turbine and increase the air velocity by placing one or more fans within the body of the intake channel and the recirculation channel.

It is another object of the present invention to increase control and communication of one or more pressure control devices, one or more fans, the turbine, and a generator. The I/O devices may be placed within the body of the intake channel and the recirculation channel to obtain data regarding the airflow. The fans, the turbine, and the generator may have I/O devices within these devices, which obtain I/O data. The I/O data obtained is sent to the I/O modules. The I/O modules send the I/O data to a controller. The controller processes I/O data received from I/O modules, then may send commands to the relevant components. The data inputs can represent various monitored attributes, each with set thresholds from different components along with the use of real-time data to respond to non-threshold situations based on I/O data from the I/O modules.

In yet another aspect, the controller forms a control function by sending commands to the various components within the system. The controller communicates with the I/O modules via an I/O interface. The memory device(s) configured to store data and computer readable instructions to be used by the processor(s). Additionally, the control system can allow for the reception of a signal from the controller via the I/O modules to integrate I/O data, which may be included with I/O data from other I/O modules or controllers. There are various types of controllers, e.g., pneumatic controllers, electric controllers, and electronic controllers. Yet still another aspect, the control system may include one or more control modules. For example, the control module may perform defined control functions for a component within the system (e.g., the fan).

BRIEF DESCRIPTION OF THE DRAWINGS

The description refers to provided drawings in which similar reference characters refer to similar parts throughout the different views, and in which.

DETAILED DESCRIPTION

One or more specific embodiments of the present invention will be described below. Not all features are detailed, as actual implementations require various designs choices based on developer goals and constraints, which may differ by case. The development may be complex and time-consuming; nonetheless, it would be a routine undertaking of design, fabrication, and manufacture for those of ordinary skill having the benefit of this disclosure.

Unless specified otherwise, terms like “coupled,” “fixed,” or “attached to” (and their derivatives) include both direct and indirect connections via one or more intermediate components or features.

The terms “upstream” and “downstream” refer to the relative direction with respect to fluid flow in a fluid pathway. For example, “upstream” refers to the direction from which the fluid flows, and “downstream” refers to the direction to which the fluid flows.

Skilled practitioners can modify, expand, omit, rearrange, or adapt the disclosed methods in various ways without departing from the scope of the present disclosure.

Figure 1:
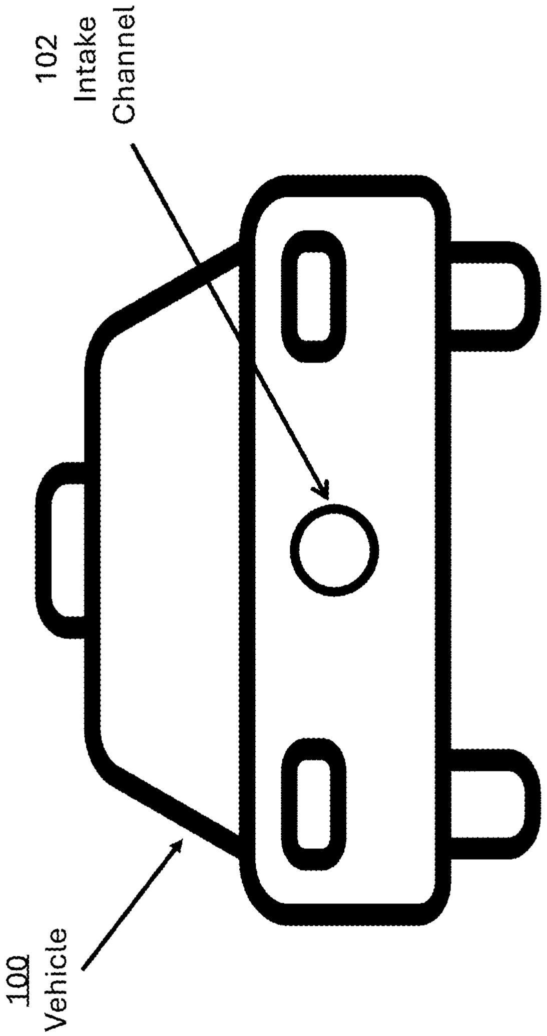
FIG. 1 illustrates a perspective view of one embodiment of a transportation vehicle with an intake channel, in accordance with an example embodiment of the presentation.

FIG. 1 embodiment includes a partial perspective view of a vehicle using a wind-based generation of electric energy methods from example embodiments. While the vehicle depicted in FIG. 1, a transportation vehicle 100 is shown, the methodologies outlined herein are applicable to various types of vehicles. There are forward-facing surfaces on the vehicles that are wind pressure peak areas, including the front grill area and bumper area. The transportation vehicle 100 includes an intake channel 102 located in the vehicle’s front area. For instance, these techniques may be adapted for use with other automobiles, motorcycles, tractors, airplanes, boats, and similar modes of transportation. These vehicles may operate in full or partial electric power. Examples include fully electric vehicles, hybrid vehicles, among others.

Figure 2:
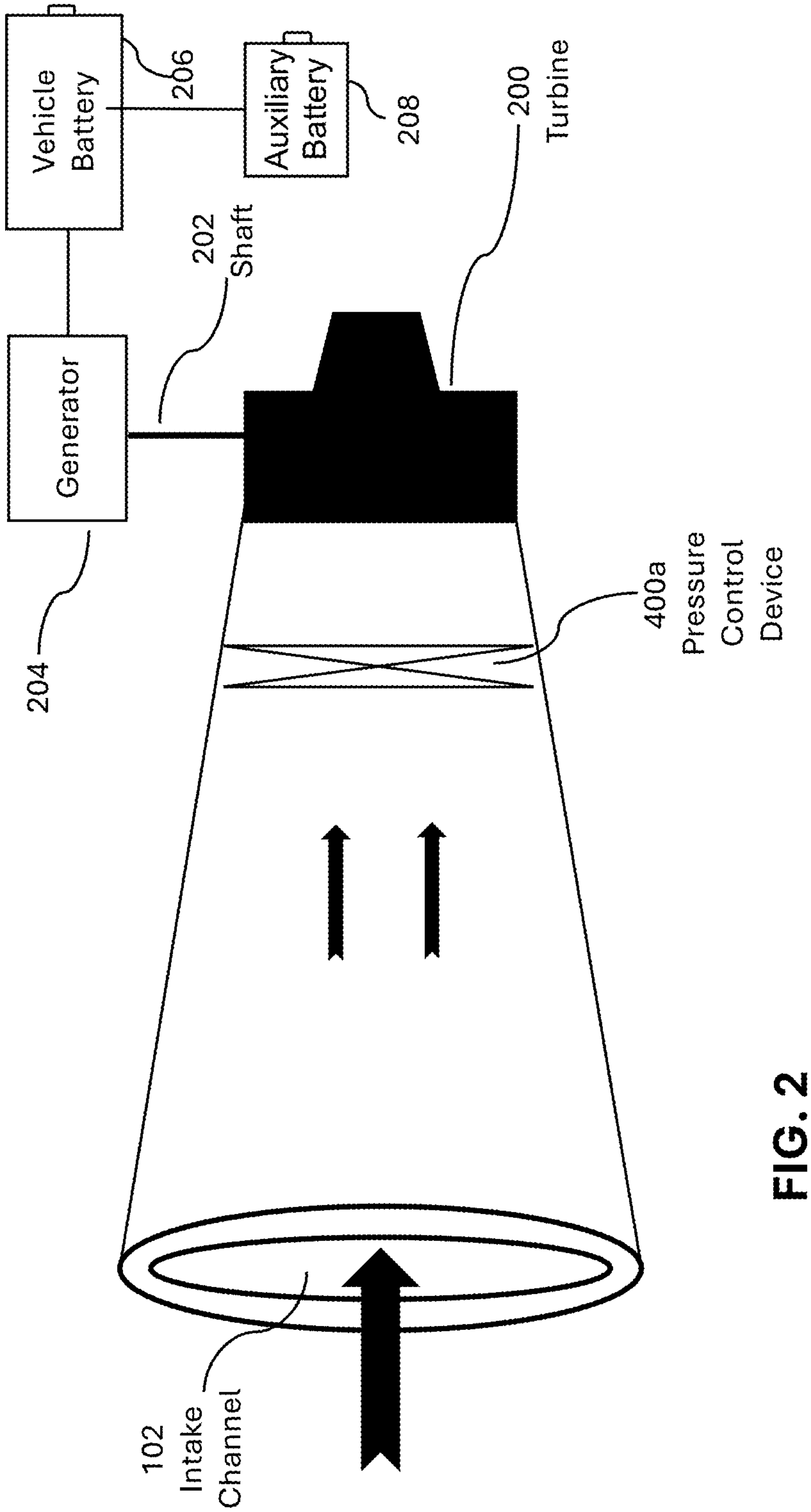
FIG. 2 illustrates a perspective view of one embodiment of a pressure control device within the body of the intake channel, in accordance with an example embodiment of the presentation.

FIG. 2 illustrates a perspective view of one embodiment of a pressure control device 400*a* within the body of the intake channel. The FIG. 2 embodiment includes the intake channel 102 shown in FIG. 1 and includes the pressure control device 400*a*, a turbine 200, a shaft 202, a generator 204, a vehicle battery 206, and an auxiliary battery 208. This invention harnesses energy from the air from forward moving vehicles. The intake channel 102 has a body into which the air can flow as a vehicle moves forward. The pressure control device 400*a* coupled between the intake channel and the turbine. The airflow from the intake channel 102 enters upstream of the pressure control device 400*a*. The airflow via the pressure control device 400*a* enters upstream of the turbine 200 and rotates the turbine blades within the turbine 200. The air from the turbine 200 increases the kinetic energy to generate electricity to charge and/or re-charge the vehicle battery 206. The shaft 202 coupled between the turbine 200 and the generator 204. The generator 204 generates power via the rotational output of the turbine 200. The generator 204 coupled to the vehicle battery 206. The auxiliary battery 208 may be communicatively coupled to the vehicle battery 206 and/or a battery management system (BMS) that is already being used to monitor and control the vehicle battery 206. The auxiliary battery 208 may be connected to the BMS via electronic connections. The auxiliary battery 208 may be used as a power source for other components within the system and/or to store excess electric power generated by the system. It is understood that components in this invention requiring electric power to operate will be operably coupled directly or indirectly to the vehicle battery 206 or the auxiliary battery 208. The auxiliary battery 208 may be charged at a charging station when the vehicle battery 206 is charged. This invention controls the consistency and pressure of the airflow within the system, whereby improving the system's performance.

Figure 3:
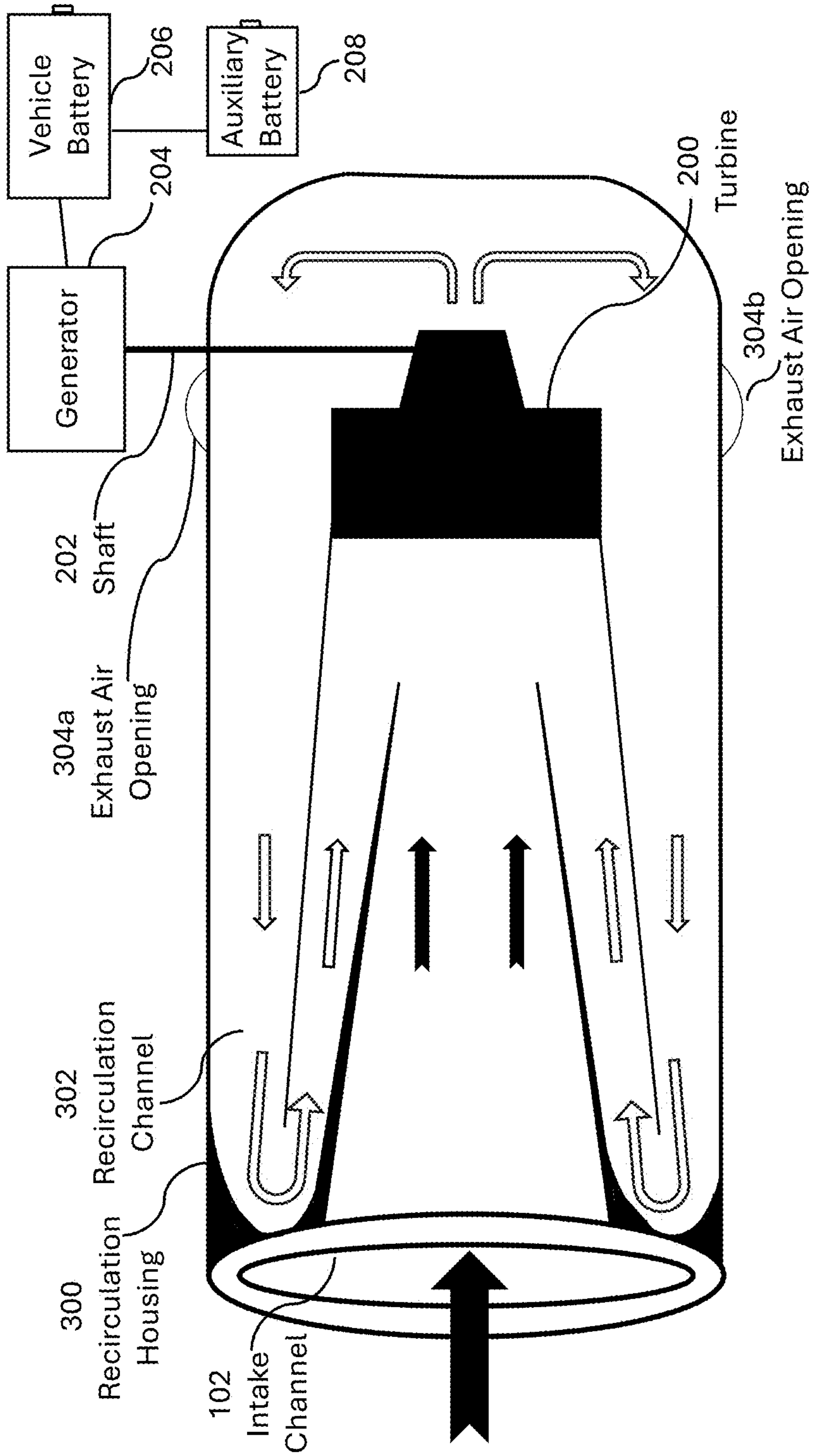
FIG. 3 illustrates a perspective view of one embodiment of an exhaust air recirculation system, in accordance with an example embodiment of the presentation.

FIG. 3 illustrates a perspective view of one embodiment of an exhaust air recirculation system. The FIG. 3 embodiment includes the intake channel 102, the turbine 200, the shaft 202, the generator 204, the vehicle battery 206, and the auxiliary battery 208 shown in FIG. 2; and includes a recirculation housing 300, a recirculation channel 302, one or more exhaust air exit openings 304*a-b*.

This invention harnesses energy from the exhaust air from the turbine 200 by recirculating the exhaust air back into the turbine 200, whereby capturing the potential lost kinetic energy. The recirculation housing 300 may be of various geometric shapes depending on the application and design. The recirculation housing 300 is preferably a cylinder design. Within the inner wall of the recirculation housing 300, there are various components (e.g., the intake channel 102, the turbine 200, and the recirculation channel 302). The airflow within the intake channel 102 is represented by black-fill arrows and the exhaust air flow within the recirculation channel 302 is represented by white-fill arrows. The turbine 200 coupled between the intake channel 102 and the recirculation channel 302. The intake channel 102 has a body into which the air can flow as a vehicle moves forward. The airflow from the intake channel 102 enters upstream of the turbine 200 and rotates the turbine blades. The exhaust air from the turbine 200 flows into the recirculation channel 302. A portion of the exhaust air within the recirculation channel 302 exits via the exhaust air exit openings 304*a-b* within the recirculation channel 302 and the recirculation housing 300; wherein the exhaust air continues to flow towards the turbine 200, then reenters the turbine 200. The shaft 202 coupled between the turbine 200 and the generator 204. The generator 204 generates power via the rotational output of the turbine 200. The generator 204 coupled to the vehicle battery 206, and the vehicle battery 206 coupled to the auxiliary battery 208.

Figure 4:
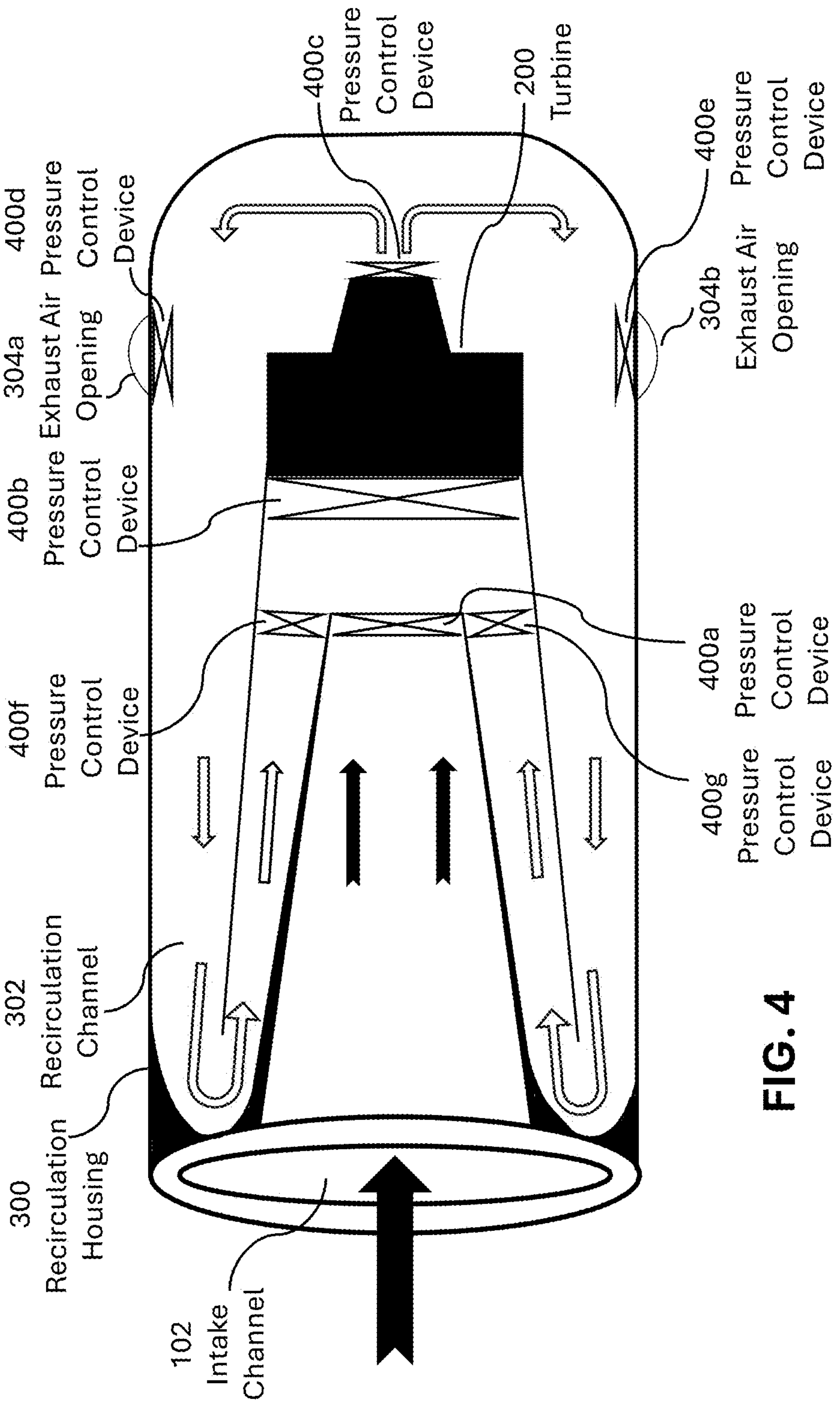
FIG. 4 illustrates a perspective view of one embodiment of the exhaust air recirculation system with pressure control devices, in accordance with an example embodiment of the presentation.

FIG. 4 illustrates a perspective view of one embodiment of an exhaust air recirculation system with the pressure control devices 400*a-g*. The FIG. 4 embodiment includes the intake channel 102, the turbine 200, the recirculation housing 300, the recirculation channel 302, and the exhaust air exit openings 304*a-b* shown in FIG. 3; and includes the pressure control devices 400*a-g*. The pressure control devices 400*a-g* may open, close, or modulate the airflow depending on system requirements. The pressure control devices 400*a* and 400*b* coupled between the intake channel 102 and the turbine 200. The pressure control device 400*c* coupled between the turbine 200 and the recirculation channel 302. The exhaust air from the turbine 200 enters the pressure control device 400*c* and then the exhaust air enters the recirculation channel 302. The pressure control device 400*c* is preferably a one-way control valve. The one-way control valve allows exhaust air from the turbine 200 to flow in one direction out and prevent backflow. The recirculation channel 302 coupled to the pressure control devices 400*d* and 400*e*. The pressure control devices 400*d* and 400*e* may be used to manage and control the outflow of the exhaust air via the exhaust air exit openings 304*a-b* shown in FIG. 3. The pressure control devices 400*f* and 400*g* may be used to manage and control the exhaust airflow flowing back into the turbine 200. The pressure control devices 400*a-b* and 400*d-g* are preferably control valves. The control valve can manage, and control airflow based on processing requirements of the system.

Figure 5:
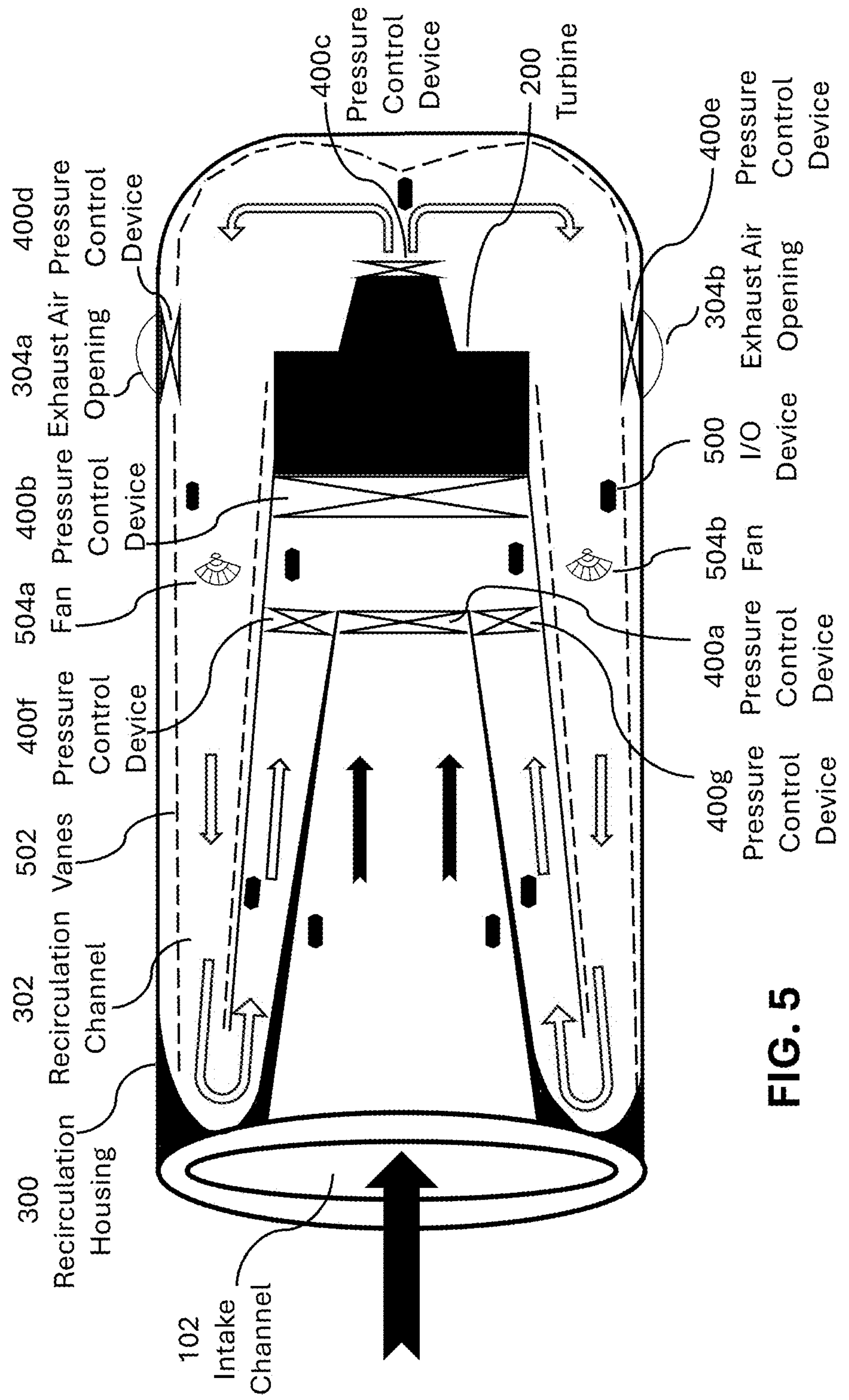
FIG. 5 illustrates a simplified, internal view of one embodiment of an exhaust air recirculation system with inputs and outputs (I/O) devices, a plurality of vanes, and fans in accordance with an example embodiment of the presentation.

FIG. 5 illustrates a simplified, internal view of one embodiment of an exhaust air recirculation system with inputs and outputs (I/O) devices 500, a plurality of vanes 502, and fans 504*a-b*. The FIG. 5 embodiment includes the intake channel 102, the turbine 200, the recirculation housing 300, the recirculation channel 302, the exhaust air exit openings 304*a-b*, and the pressure control devices 400*a-g* shown in FIG. 4; and includes the I/O devices 500, the plurality of vanes 502, and the fans 504*a-b*. The I/O devices 500 are within the body of the intake channel 102 and the recirculation channel 302. There are various types of I/O devices such as sensors, transmitters, switches, microprocessors, and application-specific integrated circuits. The I/O devices 500 may be used to measure and monitor activities and/or operations within the system (e.g., airflow, pressure, and temperature).

The plurality of vanes 502 is in the body of the recirculation channel 302. The plurality of vanes 502 may be coupled to the recirculation channel 302 to guide and direct the airflow toward the turbine 200, and to increase the airflow velocity within the recirculation channel 302.

The recirculation channel 302 coupled to the fans 504*a-b*, which may be an air-powered fan or a battery-powered fan. The air-powered fan or the battery-powered fan may be configured to guide and direct the exhaust air within the recirculation channel 302 towards the turbine 200. The use of the battery-powered fan may be communicatively coupled to the auxiliary battery 208 or to the vehicle battery 206, both batteries are shown in FIG. 3. The number of fans 504*a-b* will depend on the developer's goals.

In this embodiment, the seven I/O devices 500 and the plurality of vanes 502 are illustrated. Although for clarity only one I/O device and one vane are identified by number. The number of I/O devices 500 will depend on the developer's goals.

Figure 6:
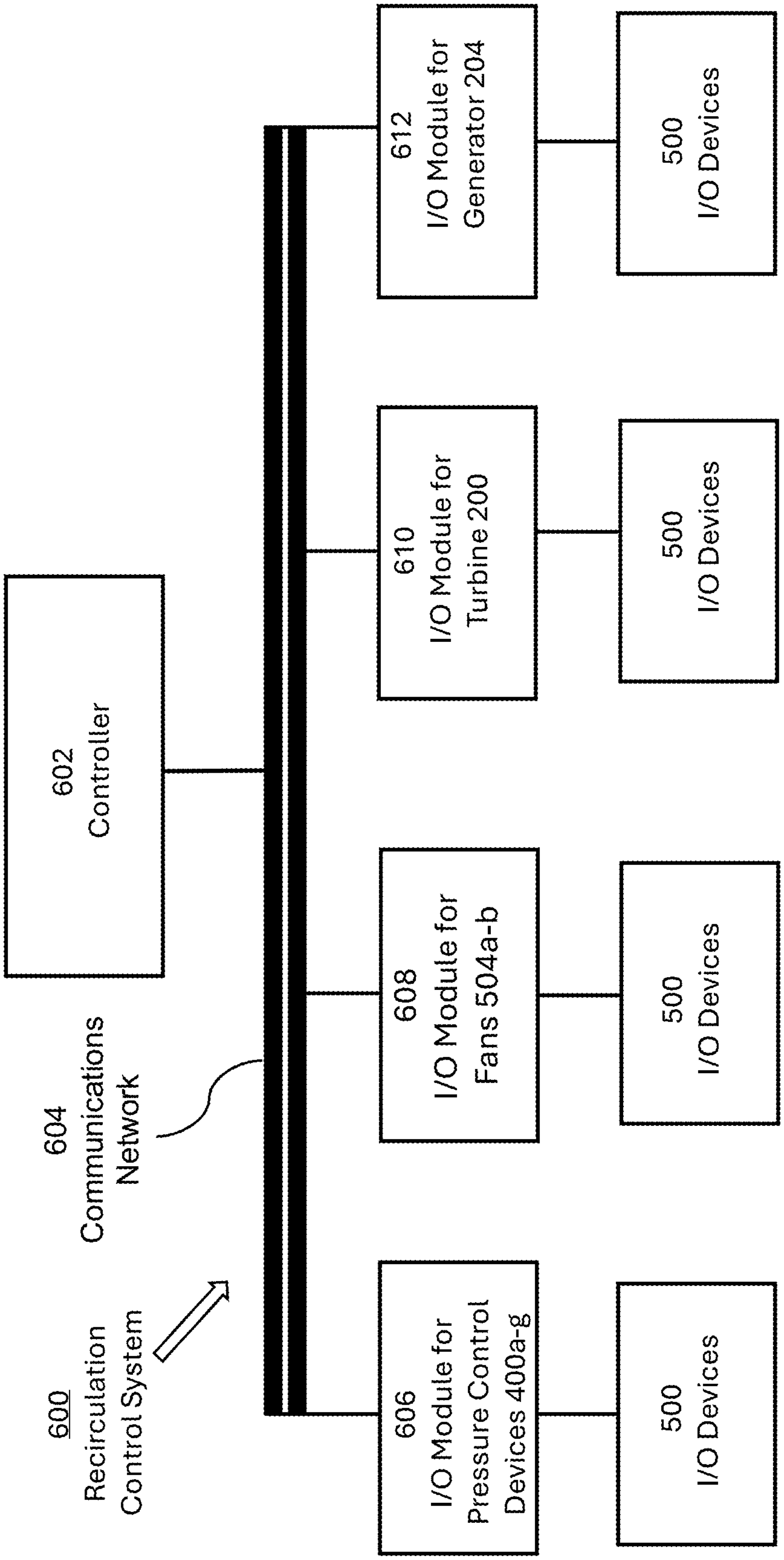
FIG. 6 illustrates a simplified, internal view of one embodiment of a schematic diagram, for a recirculation control system with a controller in accordance with an example embodiment of the presentation.

FIG. 6 illustrates a simplified, internal view of one embodiment of a schematic diagram, for a recirculation control system 600 with a controller 602. The FIG. 6 embodiments include the recirculation control system 600, the recirculation control system includes the turbine 200 and the generator 204, the pressure control devices 400*a-g*, the I/O devices 500, the fans 504*a-b*, the controller 602, a communications network 604, I/O modules 606, 608, 610, and 612. The I/O modules 606, 608, 610, and 612 manage different control system components individually. Specifically, the system may use the I/O module 606 to provide I/O data to control the pressure control devices 400*a-g*, the I/O module 608 to provide I/O data to control and monitor the fans 504*a-b*, the I/O module 610 to provide I/O data to control and monitor the turbine 200, and the I/O module 612 to provide I/O data to control and monitor the generator 204, all connected to the controller 602 via the communications network 604 for commands and monitoring. The communications network 604 may use any appropriate medium for transmitting the signals, including wired or wireless links. The controller 602 is configured to receive data from input modules and send data to output modules, using either analog which are continuously changing or discrete signals. In this embodiment, one controller 602 is disclosed; however, additional controllers may be used for specific functions (e.g., a controller for the fans 504*a-b* or the turbine 200). The controller 602 may be integrated with other controllers to increase the vehicle's overall performance.

The I/O module 606 communicatively coupled to the I/O devices 500. For the I/O devices 500, there are various types of devices that may be used based on the application and design. For example, a sensor may be used to measure the volume or velocity of air moving via the system and an air pressure sensor may be used to measure the pressure within the system. The I/O module 606 communicatively coupled to the controller 602. The I/O module 606 receives I/O data from the I/O devices 500, then the controller 602 processes I/O data received from the I/O module 606. The controller 602 sends commands to the actuators in the pressure control devices 400*a-g* to accelerate or decelerate the airflow, or to close the airflow passageway. The controller 602 may send different commands to the pressure control devices 400*a-g* (e.g., based on location and pressure within the system). For example, if a potential malfunction is identified, the controller 602 may send a command to close the pressure control device 400*a* to stop airflow into the intake channel 102, whereby discontinuing the system operations.

The I/O module 608 communicatively coupled to the fans 504*a-b*, and the fans 504*a-b* may be communicatively coupled to the vehicle battery 206 or the auxiliary battery 208, both batteries are shown in FIG. 3. The I/O module 608 may receive data from the I/O devices 500 (e.g., switches, sensors, relays) within the fans 504*a-b* (not shown). The I/O module 608 communicatively coupled to the controller 602. The controller 602 processes I/O data received from the I/O module 608. The controller 602 manages signals from the I/O module 608 to control the start and stop functions, speed function, and other operational functions of the fans 504*a-b*.

The I/O module 610 communicatively coupled to the turbine 200. The I/O module 610 may receive data from the I/O devices 500 regarding the operations and performance of the turbine 200 shown in FIG. 5. For example, the I/O devices may obtain data (e.g., speed, vibration, blade conditions, and temperature) related to the operations of the turbine 200. The I/O module 610 communicatively coupled to the controller 602. The controller 602 processes I/O data received from the I/O module 610. The controller 602 manages signals from the I/O module 610 to monitor the operations of the turbine 200 and may provide a fail-safe function for the turbine 200.

The I/O module 612 communicatively coupled to the generator 204 may be communicatively coupled to the vehicle battery 206 shown in FIG. 3. The I/O module 612 may receive data (e.g., voltage, vibration, and wear of components) from the I/O devices 500 within the generator 204. The I/O module 612 communicatively coupled to the controller 602. The controller 602 processes I/O data received from the I/O module 612. The controller 602 manages signals from the I/O module 612 to control the operations of the generator 204.

Multiple data inputs can represent various monitored attributes, each with set thresholds from different components along with the use of real-time I/O data from the I/O modules. For example, the I/O data may include data related to pressure, velocity, and components operations (e.g., key performance indicators for pressure control devices, turbine, generator, and fan).

Figure 7:
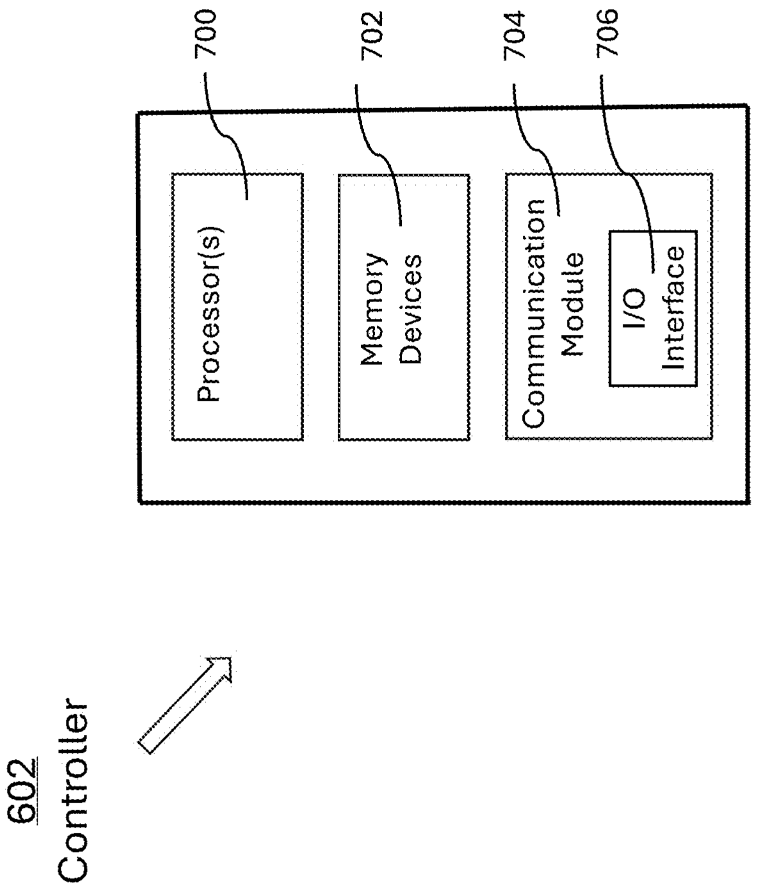
FIG. 7 illustrates a simplified, internal view of one embodiment of a schematic diagram, for a controller in accordance with an example embodiment of the presentation.

FIG. 7 illustrates a simplified, internal view of one embodiment of a schematic diagram, for the controller 602. The FIG. 7 embodiment includes a possible configuration for the controller 602. The controller 602 includes one or more processors 700, one or more memory devices 702, a communications module 704, and an I/O interface 706. The communications module 704 enables interaction between the I/O interface 706 and the I/O modules 606, 608, 610, and 612; and may include interaction with the system's components such as pressure control devices 400*a-g*. The I/O interface 706 may feature one or more analog-to-digital converters to process signals. The I/O modules 606, 608, 610, and 612 may be communicatively connected to the I/O interface 706 to convert signals from the I/O devices 500 into a format interpretable by the processor(s) 700. The processor(s) 700 and memory device(s) 702 are configured to execute multiple computer functions (e.g., perform calculations, data analysis, make decisions, and send commands). The memory device(s) 702 configured to store data and computer readable instructions to be used by the processor(s) 700.

The term "processor" refers not only to integrated circuits as a computer, but also includes microcomputers, programmable logic controllers (PLCs), controllers, microcontrollers, application-specific integrated circuits, and other programmable circuits. Memory device(s) may include random access memory (RAM), flash memory, floppy disks, digital versatile discs (DVDs), magneto-optical disk (MOD), read only memory (ROM) or similar elements capable of storing computer-readable instructions that enable a controller to perform its described and related functions via processor(s).

What is claimed:

1. A system comprising:

an intake channel in a vehicle, the intake channel having a body into which ambient air can flow as the vehicle moves forward;

one or more pressure control device;

a turbine; and a controller;

wherein the one or more pressure control device is coupled between the intake channel and the turbine;

wherein the intake channel is located upstream of the one or more pressure control device;

wherein the ambient air within the intake channel flows into the one or more pressure control device, and wherein the one or more pressure control device regulates the ambient air to produce a regulated airflow output upstream of the turbine;

wherein the turbine is rotatable by the regulated airflow output;

wherein the turbine generates energy for charging or recharging a battery in the vehicle; and where in the controller receives one or more real-time data input, the one or more real-time data input representing a respective one or more monitored attribute, and wherein the controller is configured to control operations of the one or more pressure control device based on the one or more real-time data input.

2. The system of claim 1, further comprising a pressure regulator, a valve, a damper, a control valve, a one-way control valve, a control damper, or a combination thereof.

3. The system of claim 1, further comprising an auxiliary battery.

4. The system of claim 1, further comprising an inputs and outputs (I/O) module communicatively coupled to one or more I/O device and the controller, wherein the controller is configured to control the one or more pressure control device by sending one or more command to an actuator in the one or more pressure control device to manage airflow conditions according to a set threshold or real-time data in the intake channel.

5. The system of claim 4, wherein the one or more I/O device is selected from the group consisting of sensors, transmitters, switches, microprocessors, and application-specific integrated circuits.

6. The system of claim 4, wherein the controller is an electric controller, a pneumatic controller, or an electronic controller.

7. The system of claim 1, further comprising the vehicle.

8. A system comprising:
an intake channel in a vehicle, a turbine, a recirculation channel, one or more pressure control device, a controller, and one or more exit opening;
wherein the one or more pressure control device is coupled between the intake channel and the turbine;
wherein the intake channel has a body into which ambient air flows as the vehicle moves forward;
wherein the ambient air within the intake channel flows into the one or more pressure control device, wherein the one or more pressure control device regulates the ambient air to produce a regulated airflow output upstream of the turbine;
wherein the turbine is rotatable by the regulated airflow output;
wherein the intake channel is upstream of the turbine;
wherein an exhaust airflow downstream of the turbine enters the recirculation channel;
wherein a portion of exhaust airflow within the recirculation channel exits the system via an exhaust exit opening in the recirculation channel;
wherein a remaining portion of the exhaust airflow continues to flow towards the turbine and then reenters the turbine; and
where in the controller receives one or more real-time data input, the one or more real-time data input representing one or more monitored attribute, and wherein the controller is configured to control operations of the one or more pressure control device based on the one or more real-time data input.

9. The system of claim 8, further comprising:
a housing, the housing having an opening with a cylinder design.

10. The system of claim 8, further comprising a plurality of vanes coupled within the recirculation channel.

11. The system of claim 8, further comprising one or more inputs and outputs (I/O) device, one or more I/O module, or one or more control module.

12. The system of claim 11, wherein the one or more I/O device is selected from the group consisting of sensors, transmitters, switches, microprocessors, relays, and application-specific integrated circuits.

13. The system of claim 8, wherein the controller is an electric controller, a pneumatic controller, or an electronic controller.

14. The system of claim 8, wherein the one or more pressure control device is a first set of one or more pressure control device, further comprising a second set of one or more pressure control device coupled between the recirculation channel and the intake channel.

15. The system of claim 8, wherein the one or more pressure control device is selected from the group consisting of pressure regulators, valves, dampers, control valves, one-way control valves, and control dampers.

16. The system of claim 8, further comprising an inputs and outputs (I/O) module communicatively coupled to one or more I/O device and the controller, wherein the controller is configured to control the one or more pressure control device by sending commands to an actuator in the one or more pressure control device to manage airflow conditions according to a set threshold and/or each of the respective one or more monitored attribute in the intake channel or the recirculation channel.

17. The system of claim 8, further comprising an auxiliary battery.

18. The system of claim 8, further comprising one or more fan.

19. The system of claim 18, further comprising of the one or more fan is an air-powered fan or a battery-powered fan coupled to a battery.

20. The system of claim 18, further comprising an I/O module communicatively coupled to one or more I/O device, wherein the controller is configured to control the one or more fan by sending commands to one or more control components in the one or more fan to manage airflow conditions according to a set threshold and/or each of the respective one or more monitored attribute in the intake channel or the recirculation channel.

21. The system of claim 18, further comprising an I/O module communicatively coupled to one or more I/O device, wherein the controller is configured to control the turbine by sending commands to control components of the one or more fan to manage airflow conditions according to a set threshold and/or each of the respective one or more monitored attribute in the intake channel or the recirculation channel.

22. The system of claim 18, further comprising an I/O module communicatively coupled to one or more I/O device, wherein the controller is configured to control a generator by sending commands to control components of the one or more fan to manage airflow conditions according to a set threshold and/or each of the respective one or more monitored attribute in the intake channel or the recirculation channel.

23. The system of claim 8, further comprising the vehicle.

* * * * *